3,273,972
SULPHURIC ACID LEACHING OF URANIUM-BEARING MATERIAL

Robert A. Campbell, James D. Elliott, James R. Fisher, and Val Opratko, Elliot Lake, Ontario, Canada, assignors to Rio Algom Mines Limited, Toronto, Ontario, Canada, a corporation of Canada
No Drawing. Filed Dec. 14, 1962, Ser. No. 244,571
7 Claims. (Cl. 23—322)

This invention relates to the extracting of uranium values from uranium bearing material and more particularly to improvements in a method of sulphuric acid leaching of uranium-bearing material.

It is known to extract uranium values from uranium-bearing materials by subjecting the materials to acidic leaching and sulphuric acid is a common reagent in commercial usage for this purpose. Generally, the expense entailed in obtaining the requirement of sulphuric acid, either produced on site in a sulphuric acid producing plant or purchased, usually in excessive amounts, for use in the leaching plant, has substantially increased the overall operating cost of extraction.

A more economical mode of providing sufficient sulphuric acid for leaching has been advanced to reduce this cost. Briefly, it has been proposed to generate sulphuric acid for the leaching of the uranium-bearing material by oxidation of mineral sulphides present in or added to the uranium-bearing ore. In this process the sulphides and uranium-bearing material are fed together to reaction vessels maintained at elevated temperature and under a partial pressure of oxygen in the oxygen-bearing oxidizing agent for the generation of sulphuric acid and subsequent leaching of the uranium-bearing material within the reaction vessels. This method has been called "pressure leaching" which, although obviating the necessity of adding sulphuric acid reagent in accordance with previous practice, demands special equipment, particularly pressure vessels such as autoclaves. Such equipment is relatively expensive because of the severe operating conditions and the extent of equipment required is dictated by the large quantities of ore slurry containing the sulphide minerals and uranium-bearing material to be handled, either batchwise or continuously, on a plant-scale for the combined operations of generation of sulphuric acid and leaching of the uranium-bearing material. In addition to the disadvantages of expense and extent of the special equipment, the size of plant area and facilities are commensurate with the equipment to carry out the so-called pressure leaching.

The present invention is directed to overcoming the foregoing disadvantages and accordingly, it is an object of the present invention to provide improvements in the method for the acidic leaching of uranium-bearing material, which improvements render the overall leaching method more efficient and less expensive than methods used heretofore.

A further object of the present invention is to provide a novel mode of producing from sulphide materials, sulphuric acid and sulphates to leach uranium-bearing material.

In accordance with the present invention, a sulphide concentrate, prepared from a slurry containing sulphide minerals, is treated under oxidizing conditions to produce sulphuric acid and sulphates which are mixed with uranium-bearing material for leaching thereof. Hence, the actual leaching reagent is produced as part of the overall extraction method in a relatively simple and inexpensive manner as hereinafter described.

The quantity of sulphide concentrate required to satisfy the acid usage will vary with each ore, depending upon the acid consumption and/or requirement of the particular ore. Sufficient sulphates and sulphuric acid must be oxidized to produce the required amount of acid.

The sulphide concentrate may be prepared from a slurry of sulphide minerals obtained from one of three sources.

Firstly (Case 1), there are many uranium-bearing ores in which various uranium minerals are associated with iron sulphides, e.g. pyrite and pyrrhotite, and from such ores the necessary chemical elements are present to form the required leaching reagents to put the uranium into solution as sulphate. An example of this type of uranium ore is the pebble conglomerate of the Blind River area of Northern Ontario, Canada. In the matrix of this ore the uranium minerals uraninite, gummite, brannerite, thucolite, as well as others difficult to identify and in various trace amounts, are intimately associated with (generally) from 4 to 8 percent of the ore weight of iron sulphides, principally pyrite ($FeS_2$, 95%) and pyrrhotite ($Fe_7S_8$, 5%), as well as other mineralization such as quartz, calcite, sericite, feldspar, and others. In this first case, the uranium-bearing ore containing the sulphide minerals is reduced to a finely divided form and mixed with water to form an ore slurry which is subjected to flotation or any other suitable separation treatment to obtain a sulphide concentrate and uranium tailings.

As a second source (Case 2), leach tailing containing sulphide minerals in the form of a sulphide mineral slurry is similarly subjected to a separation treatment, usually flotation, to obtain a sulphide concentrate.

As a third source (Case 3), the sulphide concentrate may be obtained from a slurry of finely divided sulphide minerals (having at least 30% sulphur in the solids) extracted from sulphur rich ores other than the ores containing the uranium values to be extracted in the method. For example, a pyrite concentrate may be obtained from a mill in Northwestern Quebec, Canada.

The sulphide concentrate should be capable of providing sufficicnet acidic reagent to leach the uranium bearing material. In the case where the sulphide concentrate from either of sources 1 or 2 is deficient in this respect, it may be supplemented by the addition of slurry containing sulphide minerals obtained from the third source to the deficient slurry from either the first or second source.

Having prepared the sulphide concentrate, it is charged to a pressure vessel, such as an autoclave, to be oxidized to sulphuric acid and sulphates. The oxidation comprises treating the sulphide concentrate with an oxidizing agent such as oxygen or any other oxygen bearing oxidizing gas at a temperature of between 130° C. and 180° C. and at a pressure of between 35 p.s.i. g., and 280 p.s.i.g. under sufficient agitation to maintain a substantially uniform dispersion of solids in the concentrate liquid. It is preferred to have a temperautre of between 150° C. and 170° C. and a pressure of between 100 and 180 p.s.i.g.

After oxidation, the discharge containing sulphuric acid and sulphates from the pressure vessel is mixed with the uranium-bearing material to be fed to the leaching operation. The leaching of the uranium-bearing material is carried out in conventional pachuca or agitator leach plant and by conventional techniques. For example, the uranium is separated from the bulk of the gangue by dilute (40 to 100 gms./l.) sulphuric acid leaching in pachuca tanks or agitators at approximately 70% solids pulp and at a temperature of from 65° C. to 75° C. for from 40 to 90 hours.

By using the above described process of this invention, it should be apparent that the extent of equipment required for producing the sulphuric acid and sulphates by oxidation is substantially reduced in comparison to that required by prior processes in that only the sulphide concentrate is fed to the oxidation equipment whereas previously the combined sulphide concentrate and uranium-bearing material was fed to this equipment. Since this equipment is relatively expensive to purchase, maintain and operate, a reduction in the amount of equipment required represents considerable savings in the overall cost of the extraction process. Furthermore, less plant area and operating facilities are required.

The invention is illustrated by the following examples numbered to correspond to the three cases described above.

EXAMPLE 1 (CASE 1)

In accordance with known methods, 2645 mls. of ore pulp containing finely divided sulphide minerals and uranium bearing material was prepared. This pulp was at 35% solids (S.G., 1.286) and contained 1189 grams of dry solids. The pulp was placed in the bowl of a Wemco 500 gm. Fagergren laboratory flotation machine and conditioned for 2 minutes with 0.15 lb./ton of Cyanamid 301 collector and 0.09 lb./ton of pine oil collector-frother. The conditioned pulp was floated for 3 minutes. The average of four floats gave a weight recovery of 13.8% and on calculated heads a sulphur recovery of 87.5%, iron recovery of 93.0% and uranium recovery in concentrate of 19.0%. This flotation concentrate (164 grams) was placed in an autoclave with 365 mls. of water to make a pulp of 31% solids. The autoclave was heated to 160° C. and an oxygen pressure of 145 p.s.i. (gauge) and adequate agitation was maintained for 6 hours. During mid Aeroxanthate 301 and 0.13 lb./ton of pine oil collector-frother. The conditioned pulp was floated for 3 minutes. The flotation concentrate was again placed in the flotation cell bowl and conditioned for 1 minute with 0.06 lb./ton of pine oil. The conditioned rougher concentrate was floated for 2 minutes. The cleaner tailing was combined with the rougher tailing. The weight recovery was 11.6% and on calculated heads gave sulphur recovery 94.9%, iron recovery 95.0 and uranium recovery in concentrate 25.2%.

After flotation, the flotation concentrate (138 gms.) was placed in an autoclave with 585 mls. of water at 19.1% solids. The autoclave was heated to 160° C. and an oxygen pressure of 140 p.s.i. (gauge) and adequate agitation was maintained for 6 hours. During this time the atmosphere above the reaction was partially changed 8 times by reducing the pressure to 110 p.s.i. gauge with the oxygen valve closed then refilling with fresh oxygen to ensure a sufficient supply of oxygen for oxidizing the sulphide minerals to sulphuric acid and sulphates.

At the end of the six hours the autoclave contents were transferred to a leaching kettle and 1189 gms. of solids as a moist filter cake of uranimum-bearing materials leach feed were added. The total was made up to 73% solids with water. This pulp was agitated at 71° C. for 72 hours. Samples were taken of solids and solution and analysed. Results are presented in Table II.

*Table II*

| Material | Amount | Assays, percent | | | Content, gms. | | | Distribution, percent | | |
|---|---|---|---|---|---|---|---|---|---|---|
| | | Fe | S | $U_3O_8$ | Fe | S | $U_3O_8$ | Fe | S | $U_3O_8$ |
| Autoclave feed (Conc. from flotation of leach tailing) | 1,389 gms | 28.8 | 29.92 | 0.017 | 39.74 | 41.29 | 0.024 | 48.4 | 47.2 | 1.7 |
| New Ore | 1,189 gms | 3.5 | 3.90 | 0.115 | 42.19 | 46.32 | 1.369 | 51.6 | 52.8 | 98.3 |
| Calc. head before leach | 1,327 gms | 6.2 | 6.60 | 0.105 | 81.93 | 87.61 | 1.393 | 100.0 | 100.0 | 100.0 |
| Leach kettle discharge: | | | | | | | | | | |
| Solids | 1,259 gms | 4.8 | 5.44 | 0.003 | 60.43 | 68.49 | 0.038 | 73.8 | 78.1 | 2.7 |
| Solutions | 408 mls | *52.7 | *46.87 | *3.32 | 21.50 | 19.12 | 1.355 | 26.2 | 21.9 | 97.3 |
| Calc. head after leach | 1,327 gms | 6.2 | 6.60 | 0.105 | 81.93 | 87.61 | 1.393 | 100.0 | 100.0 | 100.0 |

*Assayed in grams per litre.

this time the autoclave was cooled three times below 100° C. and the pressure released to change the atmosphere above the reaction to ensure a sufficient supply of oxygen for oxidation. At the end of six hours, the autoclave contents were transferred to a leaching kettle. The moist flotation tailing of uranium-bearing material was added and the total made up to 68% solids with water. This pulp was agitated at 65° C. for 24 hours. Samples were taken of solids and solution and analysed. The results are shown in Table I.

EXAMPLE 3 (CASE 3)

An amount of 86 grams of pyrite concentrate obtained from Northwest Quebec, Canada, was placed in an autoclave with 516 mls. of water at 14.3% solids. The autoclave was heated to 160° C. and a total pressure of 140 p.s.i. (gauge) was maintained with oxygen for 6 hours. During this time the atmosphere above the reaction was partially changed 6 times by reducing the pressure to 110 p.s.i. (gauge) with the oxygen inlet valve closed then

*Table I*

| Material | Amount | Assays, percent | | | Content, gms. | | | Distribution, percent | | |
|---|---|---|---|---|---|---|---|---|---|---|
| | | Fe | S | $U_3O_8$ | Fe | S | $U_3O_8$ | Fe | S | $U_3O_8$ |
| Flotation concentrate (Autoclave feed) | 164 gms | 21.5 | 23.27 | 0.162 | 35.19 | 38.17 | 0.266 | 93.0 | 87.5 | 19.0 |
| Flotation tailings | 1,025 gms | 0.3 | 0.53 | 0.110 | 2.65 | 5.45 | 1.132 | 7.0 | 12.5 | 81.0 |
| Calc. head before leach | 1,189 gms | 3.2 | 3.67 | 0.117 | 37.84 | 43.62 | 1.398 | 100.0 | 100.0 | 100.0 |
| Leach kettle discharge: | | | | | | | | | | |
| Solids | 1,181 gms | 2.4 | 2.50 | 0.007 | 28.34 | 29.53 | 0.083 | 74.9 | 67.7 | 5.9 |
| Solution | 525 mls | *18.0 | *26.7 | *2.49 | 9.50 | 14.09 | 1.315 | 25.1 | 32.3 | 94.1 |
| Calc. head after leach | 1,189 gms | 3.2 | 3.67 | 0.117 | 37.84 | 43.62 | 1.398 | 100.0 | 100.0 | 100.0 |

*Assayed in grams per litre.

EXAMPLE 2 (CASE 2)

By known methods, 4775 mls. of water washed pulp (pH 6.5) of leach tailings containing sulphide minerals was prepared. This pulp at 24.9% solids (S.G. 1.186) and containing 1189 grams of dry solids was floated in a Wemco 500 grams Fagergren laboratory flotation machine and conditioned for 2 minutes with 0.22 lb./ton of Cyanarefilling with fresh oxygen to ensure a sufficient supply of oxygen to the oxidation reaction. There was adequate agitation in the autoclave.

At the end of the six hours, the autoclave contents were transferred to a leaching kettle and 1189 grams of dry solids as moist filter cake of uranium-bearing material leach feed were added. The total was made up to 66.3% solids with water. This pulp was agitated at 71° C. for 72 hours. Samples were taken of solids and solution and analysed. The results are shown in Table III.

5. The method of claim 4 further characterized in that the aqueous concentrate of sulphide minerals is recovered from the slurry by flotation from the leach tailings.

Table III

| Material | Amount | Assays, percent | | | Content, gms. | | | Distribution, percent | | |
|---|---|---|---|---|---|---|---|---|---|---|
| | | Fe | S | $U_3O_8$ | Fe | S | $U_3O_8$ | Fe | S | $U_3O_8$ |
| Autoclave feed (A pyrite concentrate from Mill in N.W. Que.) | 84 gms | 47.2 | 44.32 | Nil | 39.67 | 37.22 | Nil | 51.8 | 46.5 | Nil |
| New Ore | 1,189 gms | 3.1 | 3.59 | 0.103 | 36.93 | 42.70 | 1.223 | 48.2 | 53.5 | 100.0 |
| Calculated head before leach | 1,273 gms | 6.0 | 6.28 | 0.096 | 76.60 | 79.92 | 1.223 | 100.0 | 100.0 | 100.0 |
| Leach kettle discharge: | | | | | | | | | | |
| Solids | 1,208 gms | 4.2 | 4.32 | 0.003 | 50.74 | 52.19 | 0.036 | 66.3 | 65.3 | 2.9 |
| Solutions | 530 mls | *48.8 | *52.33 | *2.24 | 25.86 | 27.73 | 1.187 | 33.7 | 34.7 | 97.1 |
| Calculated head after leach | 1,273 gms | 6.0 | 6.28 | 0.096 | 76.60 | 79.92 | 1.223 | 100.0 | 100.0 | 100.0 |

*Assayed in grams per litre.

What we claim as new and desire to protect by Letters Patent of the United States is:

1. A method of extracting uranium values from uranium-bearing materials which comprises (1) preparing an aqueous concentrate of sulphide minerals from a finely-divided aqueous slurry of said sulphide minerals; said aqueous-sulphide concentrate having a solids content of less than 31% by weight with the sulphide minerals containing a sufficient amount of sulphur to form acidic reagents of sulphuric acid and sulphates for leaching uranium from its ore; (2) treating said aqueous concentrate of sulphide minerals in the presence of an effective amount of oxygen and oxygen-containing gases at a temperature ranging from about 130–180° C. and at a pressure ranging from about 35 p.s.i.g. to 280 p.s.i.g. to obtain said acidic-leaching reagents; and (3) subsequently treating uranium-bearing materials with the acidic-leaching reagents at atmospheric pressures to obtain the uranium values.

2. The method of claim 1 further characterized in that the aqueous concentrate of sulphide minerals is obtained from an aqueous slurry containing sulphide minerals and uranium-bearing materials.

3. The method of claim 1 further characterized in that the aqueous concentrate of sulphide minerals is separated from the finely-divided aqueous slurry of sulphide minerals by flotation.

4. The method of claim 1 further characterized in that the finely-divided aqueous slurry of sulphide minerals is recovered leach tailings.

6. The method of claim 1 further characterized in that the aqueous concentrate of sulphide minerals has a solids content of approximately 19.1% by weight with at least 30% sulphur in the solids.

7. The method of claim 1 further characterized in that the aqueous concentrate of sulphide minerals is treated in the presence of an effective amount of oxygen at a temperature ranging from about 150–170° C. and at a pressure ranging from about 100–180 p.s.i.g.

References Cited by the Examiner

UNITED STATES PATENTS 2,797,977  7/1957  Forward et al. _____ 23—14.5

FOREIGN PATENTS 200,771  6/1955  Australia.
225,974  2/1959  Australia.

OTHER REFERENCES

Clegg et al.: "Uranium Ore Processing," 1958, Addison-Wesley Publishing Co., pp. 136–138.

Wilde et al.: "Experiments Relating to the Possible Production of an Oxidizing Acid Leach Liquor by Auto-oxidation for the Extraction of Uranium," Proceedings of the Second United Nations International Conference on the Peaceful Uses of Atomic Energy, vol. 3, 1958, United Nations Publications, pages 303–316.

BENJAMIN R. PADGETT, *Acting Primary Examiner.*

CARL D. QUARFORTH, *Examiner.*

A. G. BOWEN, S. TRAUB, *Assistant Examiners.*